(12) United States Patent
Zhang et al.

(10) Patent No.: US 11,559,848 B2
(45) Date of Patent: Jan. 24, 2023

(54) METHOD FOR WELD PERFORMANCE VALIDATION

(71) Applicant: GM GLOBAL TECHNOLOGY OPERATIONS LLC, Detroit, MI (US)

(72) Inventors: Tingting Zhang, Troy, MI (US); Spyros P. Mellas, Waterford, MI (US); Kangping Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 496 days.

(21) Appl. No.: 16/857,373

(22) Filed: Apr. 24, 2020

(65) Prior Publication Data

US 2021/0331265 A1 Oct. 28, 2021

(51) Int. Cl.
| | |
|---|---|
| *B23K 9/095* | (2006.01) |
| *B23K 31/02* | (2006.01) |
| *G01N 3/08* | (2006.01) |
| *G01N 3/02* | (2006.01) |
| *B23K 31/12* | (2006.01) |

(52) U.S. Cl.
CPC .............. *B23K 9/095* (2013.01); *B23K 31/02* (2013.01); *B23K 31/125* (2013.01); *G01N 3/02* (2013.01); *G01N 3/08* (2013.01); *G01N 2203/0296* (2013.01)

(58) Field of Classification Search
CPC ...... B23K 9/095; B23K 31/02; B23K 31/125; G01N 3/08; G01N 3/02; G01N 2203/0296
See application file for complete search history.

(56) References Cited

U.S. PATENT DOCUMENTS

| | | | |
|---|---|---|---|
| 6,186,011 B1 * | 2/2001 | Wung ...................... | G01N 3/00 73/850 |
| 2018/0275032 A1 * | 9/2018 | Gupta ................... | B23K 31/12 |

* cited by examiner

*Primary Examiner* — Jonathan M Dunlap
(74) *Attorney, Agent, or Firm* — Lorenz & Kopf LLP

(57) ABSTRACT

Methods are provided for joint performance validation and include preparing a coupon from a blank by bending the blank to have a pair of legs disposed at substantially ninety degrees relative to each other. Another coupon is prepared by forming an opening in a segment of another blank and bending the segment approximately ninety degrees. The segment is disposed adjacent an end of the second blank. A test sample is prepared by joining the coupons together at a joint with a leg attached to the segment approximately at a center of the leg. The test sample is subjected to a force test to generate data for the performance validation.

20 Claims, 6 Drawing Sheets

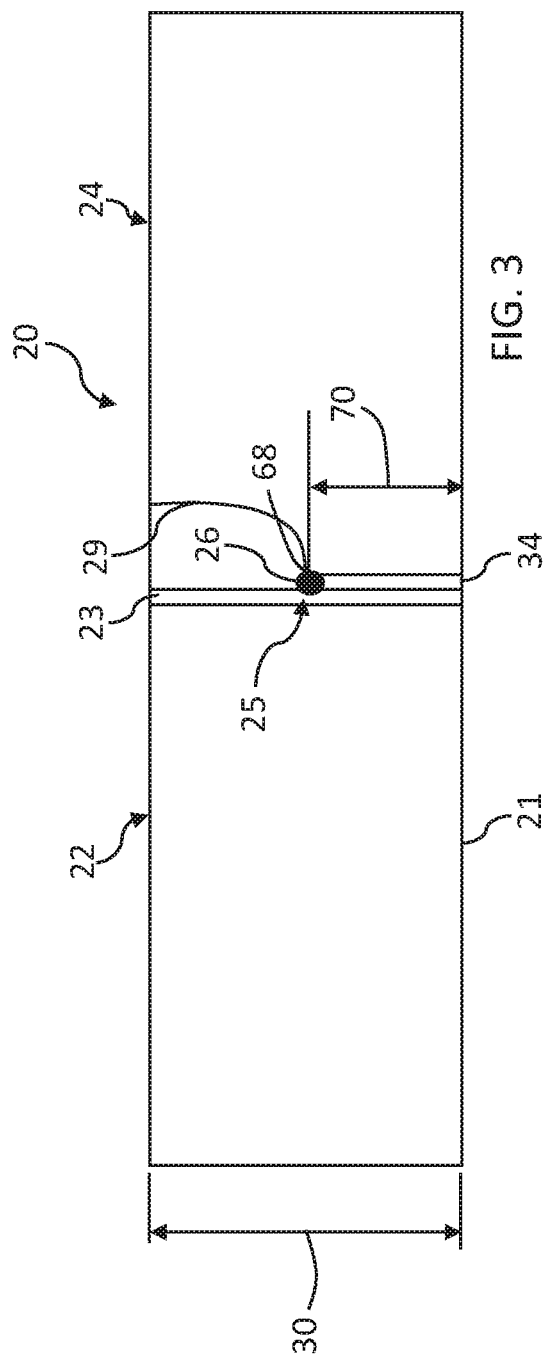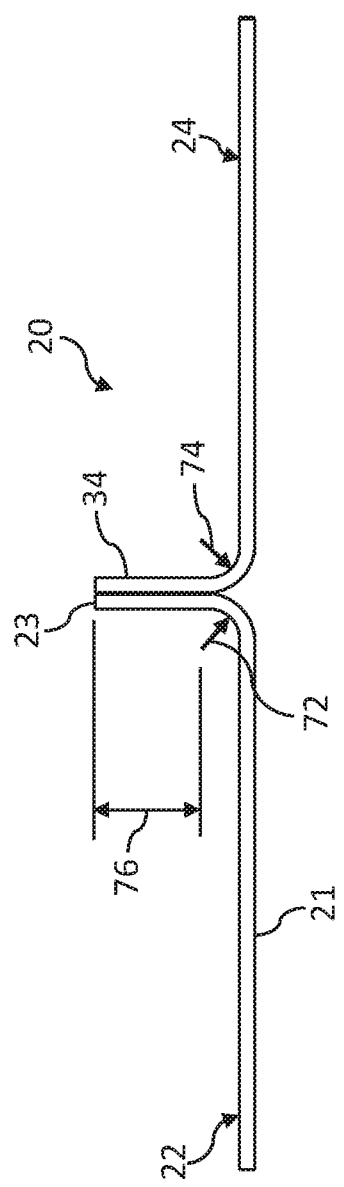

METHOD FOR WELD PERFORMANCE VALIDATION

INTRODUCTION

The present disclosure generally relates to evaluating welds, and more particularly relates to methods that include peel testing welds using test samples, collecting data, and using the data to validate weld performance.

Welding, brazing and soldering are common method of joining components together and are is used in a wide variety of applications. There are many types of welding processes including resistance welding, laser welding, gas metal arc welding, friction stir welding, and others. Determining or estimating joint characteristics for process and product validation purposes has been accomplished through a variety of approaches including using lap-shear tests, coach-peel tests, cross-tension tests and others to generate data and using that data in evaluations. In the case of coach peel testing, samples are prepared that are generally formed as L-shaped plates. The plates are joined together in an offset configuration. The samples are pulled apart and performance data is recorded to evaluate and determine parameters, such as those of a weld. The traditional coach peel test is not optimized for some types of joining methods due to allowing other types of loading conditions to confound the data being collected. For example, bending and or torsional loads may be introduced in the test, where only peel forces acting on the weld are desirable. These bending and/or torsional loads, particularly with elongated welds for example, may result in test sample failure modes and resulting data that is not accurately reflective of weld performance. Non-aligned forces may result in stress-strain curves from test samples that have an imperfect correlation with joint performance in the actual product that is later produced using the joining process being tested.

Accordingly, it is desirable to provide additional methods for evaluating and determining the characteristics of joints produced by various processes. In addition, new methods that produce test data that more accurately reflects service load conditions and joint performance would be desirable. Furthermore, other desirable features and characteristics of the present invention will become apparent from the subsequent detailed description and the appended claims, taken in conjunction with the accompanying drawings and the foregoing technical field and background.

SUMMARY

A number of embodiments include methods for weld performance validation using a peel test approach. In a number of embodiments, a coupon is prepared from a blank by bending the blank to have a pair of legs disposed at substantially ninety degrees relative to each other. Another coupon is prepared by forming an opening in a segment of another blank and bending the segment approximately ninety degrees. The segment is disposed adjacent an end of the second blank. A test sample is prepared by joining the coupons together at a joint with a leg of one coupon attached to the segment of the other coupon, approximately at a center of the leg. The test sample is subjected to a force test to generate data for the math modelling used in the performance validation.

In additional embodiments, forming the opening includes removing a corner at the end of the second blank so that the segment comprises a tab on the second coupon, and forming a radius adjacent the segment.

In additional embodiments, the radius is formed to be greater than ten millimeters in size.

In additional embodiments, forming the opening includes forming a slot in the segment.

In additional embodiments, force and displacement are recorded and the test sample is characterized using the recorded force and displacement.

In additional embodiments, the joint is formed as a weld bead along an edge of the segment.

In additional embodiments, the segment is approximately half as wide as the leg.

In additional embodiments, the coupons are pulled apart by a test machine until separation of the coupons occurs.

In additional embodiments, the separation is characterized as one of a weld failure, a coupon parent material failure, and a heat affected zone failure. When the coupon parent material failures occur, the geometry of the coupons is adjusted to align a location of the coupon parent material failure to a centerline of the coupons.

In additional embodiments, force and deflection are recorded and the joint is modeled using the force and deflection.

In a number of other embodiments, a method for joint performance validation includes fabricating a coupon by bending a blank to have a pair of legs disposed at substantially ninety degrees relative to each other. Another coupon is fabricated from a blank by removing a portion of a segment from the blank. The segment is disposed adjacent an end of the respective blank, and is bent approximately ninety degrees. A test sample is formed by joining the coupons together at a joint that comprises a weld located approximately at a center of one of the legs, with the leg attached to the segment by the weld. The test sample is subjected to a force test. Test data from the force test is recorded and the weld is evaluated using the test data.

In additional embodiments, forming the opening includes removing a corner at the end of the second blank so that the segment embodies a tab on the respective coupon, with a radius formed to extend from the tab.

In additional embodiments, forming the opening includes forming a closed slot in the segment.

In additional embodiments, force and displacement are recorded and the weld is characterized using the force and displacement.

In additional embodiments, the weld is formed as an elongated bead along an edge of the segment.

In additional embodiments, the segment extends to a point located at approximately half of the width of the leg.

In additional embodiments, the coupons are pulled apart by a test machine until separation of the coupons occurs.

In additional embodiments, the separation is characterized as one of a weld failure, a coupon failure, and a heat affected zone failure.

In additional embodiments, force and deflection are recorded and the joint is modelled using the force and deflection.

In a number of additional embodiments, a method for joint performance validation includes determining material composition and weld parameters for a product. A pair of coupons are fabricated using the material composition. One coupon is fabricated by bending a blank to have a pair of legs disposed at substantially ninety-degrees relative to each other. Another coupon is fabricated by removing a portion of a segment at an end of another blank, and bending the segment approximately ninety degrees. A test sample is formed by joining the coupons together at a weld joint located approximately at a center of the leg to attach the segment to the leg by the weld. The weld is formed using the weld parameters. A force test is performed on the test sample, force and deflection of the test sample are recorded, and the joint is modeled using the recorded force and deflection.

BRIEF DESCRIPTION OF THE DRAWINGS

The exemplary embodiments will hereinafter be described in conjunction with the following drawing figures, wherein like numerals denote like elements, and wherein:

FIG. 3 is a side view of the test sample of FIG. 1 showing coupon alignment, in accordance with various embodiments;

FIG. 4 is an alternate side view of the test sample of FIG. 1, in accordance with various embodiments;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In a number of embodiments, a method of joint performance validation includes preparing one coupon by bending a rectangular blank to have a pair of legs disposed substantially ninety degrees relative to one another. An addition coupon is prepared by removing or omitting a portion from segment near an end of a blank leaving an opening in the segment, and bending the segment approximately ninety degrees. The opening may be formed in various embodiments as a deleted corner of the blank leaving a tab as the segment, as a slot in the segment, or in other ways. A test sample is prepared by joining the coupons together with a leg of one coupon attached, approximately at its center, to the segment of the other coupon, such as by welding. The test sample is subjected to a tensile load force test and the results are recorded. The resulting data may be evaluated for weld tuning and/or for determining whether modifications to the joining process parameters are desirable. For example, variations in weld penetration may be explored. When joining process parameters are within an acceptable range, the generated test data is collected and used to model performance of a product that will be manufactured using the joining process. While embodiments described herein may apply to certain welding applications, the current disclosure is not limited to any particular type of joining process, but is broadly applicable where the evaluation of elongated joints using peel testing is desirable.

Figure 1:
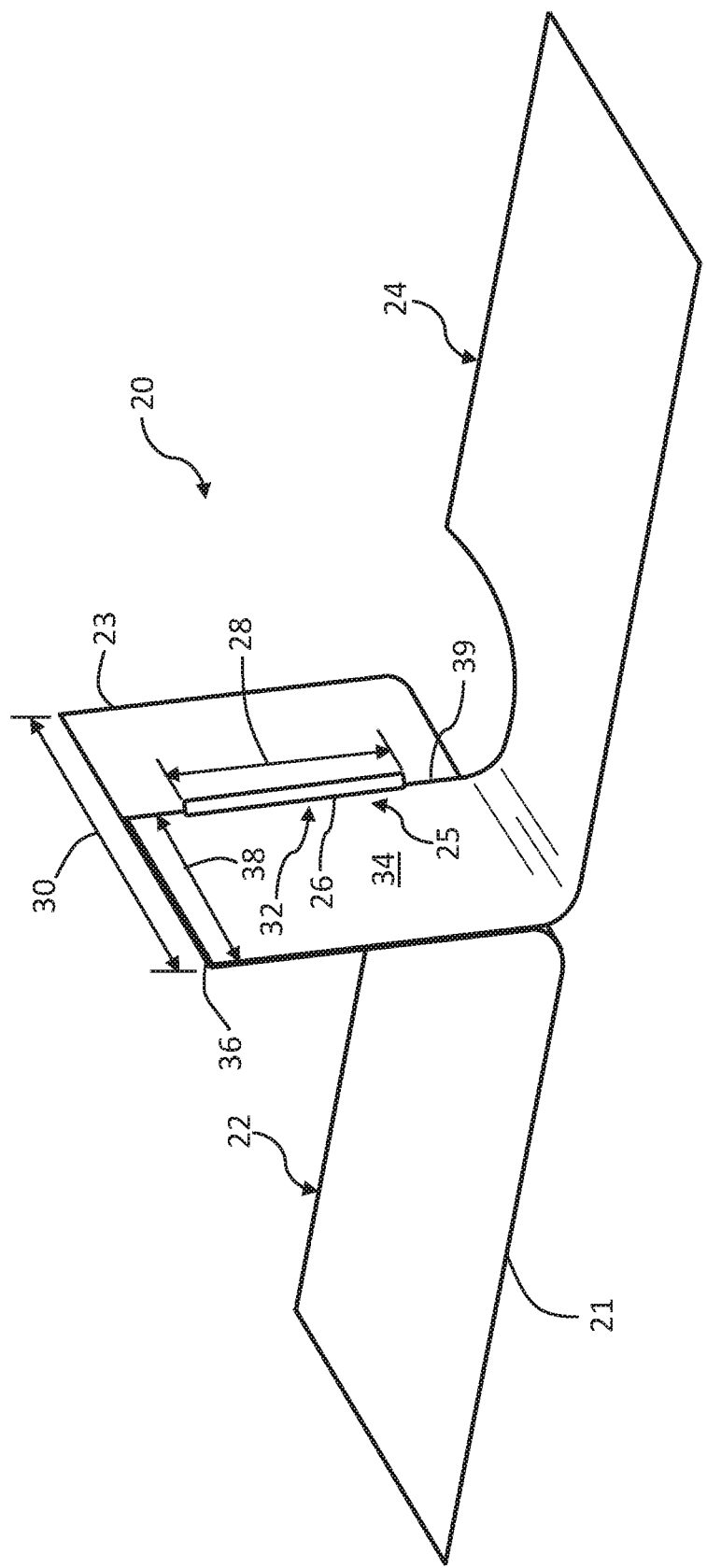
FIG. 1 is a perspective view of a dissimilar width test sample, in accordance with various embodiments.

Referring to FIG. 1, illustrated is a test sample 20 prepared to have center aligned loading. The test sample 20 is generally constructed from a pair of prepared coupons 22, 24 that are secured together at a joint 25, which includes a weld bead 26 in this embodiment. In the current embodiment the weld bead is produced by gas metal arc welding. In other embodiments, the joint 25 made be created using another type of welding process, brazing, soldering, another form of adhesion, or another joining process. The joint 25 includes the weld bead 26 where the weld is linear instead of a discrete weld, such as a single round point that would, for example, be created by a resistance spot weld or a tack gas metal arc weld. The prepared test sample 20 is advantageous for testing characteristics of the joint 25, such as in a coach peel test. In such a test, the coupons 22, 24 are pulled apart in a way that applies the load progressively along the weld bead 26 starting at one of its ends, rather than reacting the entire weld bead 26 simultaneously. The result is to separate ("unzip") the weld bead 26 in stages along its length 28. The length 28 is selected to produce a peel behavior of the weld bead 26 during a coach peel test, and is generally elongated in nature rather than circular. The coupons 22, 24 are fabricated from a material, such as metal, that has the composition and thickness of the material that will be used in a manufactured product (not shown) ultimately produced using the weld process being tested. The coupons 22, 24 are connected using the same welding process parameters that are intended to be used in manufacturing the product. Accordingly, the test sample 20 represents the welds that will be used to secure the components of the manufactured product.

The test sample 20 has center aligned loading, meaning the weld bead 26 is substantially centered relative to the width 30 of the coupon 22, and particularly of its leg 23. Centering the weld bead 26 minimizes torsional loads and produces relatively pure coach peel test results. In addition, separations during the test are encouraged to occur in the weld bead 26, and/or in a heat affected zone 32, where failure progressively works its way along the weld bead length 28. Encouraging these separations over other separations, such as tears of the base/parent material of the coupons 22, 24 away from the heat affected zone caused by torsional loads, produces more pure peel results. The heat affected zone 32 is the area of the coupons 22, 24 around the weld bead 26 that comprise a non-melted area of the base coupon material that has undergone changes in material properties as a result of being exposed to the high temperatures of the welding process. By urging separations to occur in these areas, accurate information of the strength of the weld bead 26 may be produced. In certain material combinations a parent material tear may occur, however the current embodiment minimizes torsion or bending loads because the coupon 22, 24 centerlines and the weld bead 26 centerline are aligned. The data collected reflects optimized peel conditions. Additionally, if parent material failures are occurring the geometry of the coupons 22, 24 may be adjusted to align the coupon parent material failure location to the centerline of the coupons. This may be done to further reduce non-peel loads from influencing the data.

In the embodiment of FIG. 1, the coupon 22 has a pair of legs including a longitudinal leg 21, and a lateral leg 23 that are perpendicular meaning they are disposed at, or approximately at, ninety degrees relative to one another. The coupon 24 has a segment 34 at or adjacent its end 36 in the form of a tab with a width 38 that is approximately half of the width 30 of the leg 23 of the coupon 22. With this configuration, the coupon 24 is produced by removing (or omitting), a corner of the coupon 22 at the end 36 leaving an opening 39 where the corner would otherwise reside. Other embodiments may produce a similar center aligned loading result.

Figure 2:
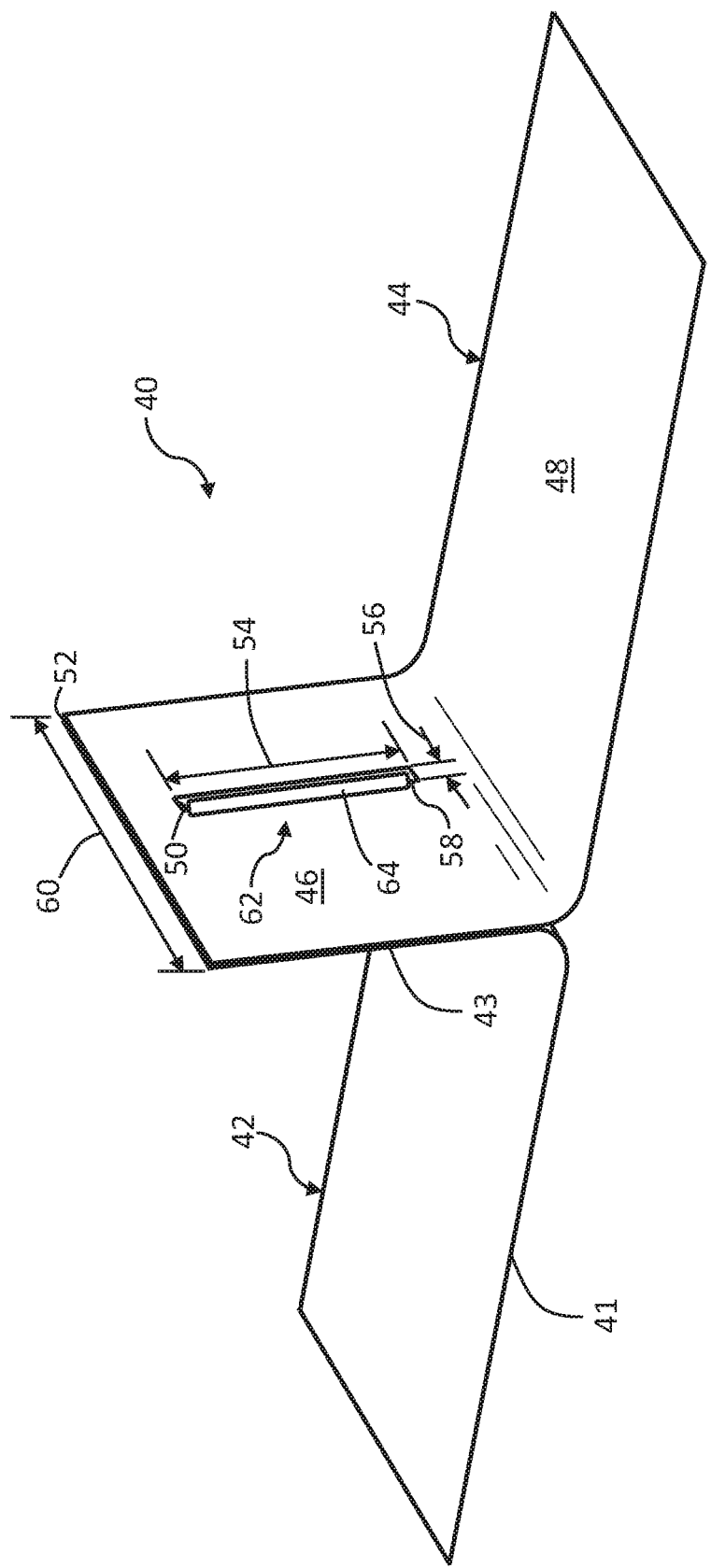
FIG. 2 is a perspective view of a slotted test sample, in accordance with various embodiments.

For example, the embodiment of FIG. 2 includes a test sample 40 created from coupons 42, 44 that are secured together by a joint 62 in the form of a weld bead 64. The coupon 42 is substantially similar to the coupon 22 of FIG. 1 and includes a pair of legs 41, 43 disposed at, or approximately at, ninety degrees relative to one another. The coupon 44 includes a segment 46 in the form of a leg that is bent at, or approximately at, ninety degrees relative to a segment 48 of the coupon 44. The segment 48 comprises another leg of the coupon 44. As such, the coupon 44 is generally formed in a shape similar to the coupon 42, but includes an opening 50 in the form of a slot that is formed in the segment 46. As such, the opening 50 is disposed in the segment 46 that is adjacent the end 52 of the coupon 44. In other embodiments, the opening 50 may be embodied as a slot that extends through the end 52, rather than have a closed configuration. The slotted coupon 44 may be advantageous when thin or lightweight materials are used for the coupon 44 to help avoid torsional loads, twisting and/or tearing. In the current embodiment, the opening 50 has a length 54 and a width 56, which in this embodiment have magnitudes of twenty-five millimeters and six millimeters, respectively. An edge 58 of the opening 50 is centered along the width 60 of the segment 46. This places the edge at the center of the width of the leg 43. The joint 62 is formed at the edge 58, such as by creating a weld bead 64 along the edge 58. The weld bead 64 may extend the complete length 54 of the opening 50 or may be shorter than the length 54.

Figure 5:
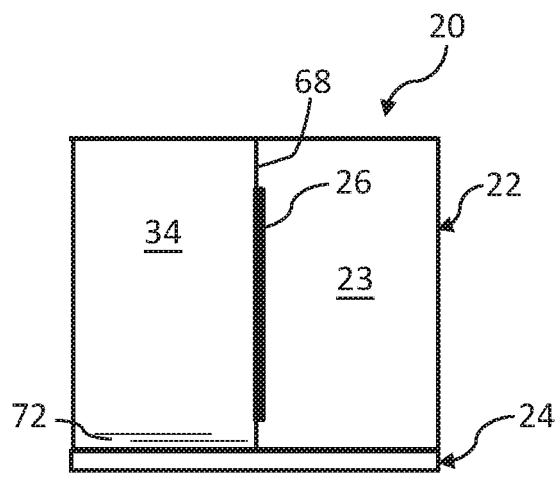
FIG. 5 is an end view of the test sample of FIG. 1, in accordance with various embodiments.
Figure 6:
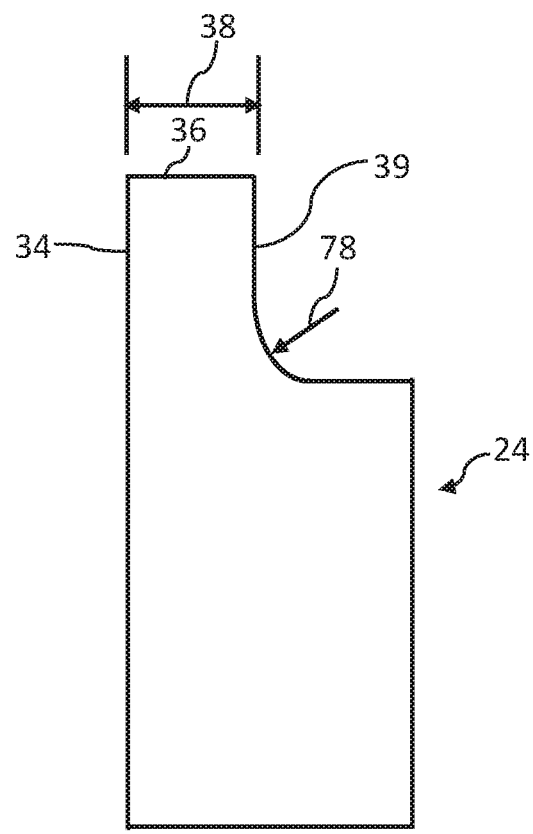
FIG. 6 is a view of an in-process coupon for use in the test sample of FIG. 1, in accordance with various embodiments.

As shown in FIGS. 3, 4 and 5, the test sample 20 is configured with the leg 23 of the coupon 22 disposed against the tab shaped segment 34 of the coupon 24. The weld bead 26 is formed at an edge 68 of the segment 34 created by the removal or omission of material to form the opening 39. The edge 68 is disposed at a distance 70 that is one-half the width 30 of the leg 23. In this embodiment, the width 30 is fifty millimeters and the distance 70 is twenty-five millimeters. The coupons 22, 24 are bent with smooth radii 72, 74 respectively, of six millimeters. The leg 23 and the segment 34 have heights 76 of forty-one millimeters from the end of the radii 72, 74. The coupon 22 is readily formed starting with a rectangular blank. FIG. 6 illustrates the coupon 24 as an in-process blank prior to bending. The opening 39 is formed adjacent the end 36 with the segment 34 left as a tab extending from the remainder of the coupon 24. An advantageous large radius 78 is formed adjacent the segment 34, which in the current embodiment is thirteen millimeters. An otherwise tight radius may lead to stress risers or stress concentrations that are avoided by the radius 78.

Figure 7:
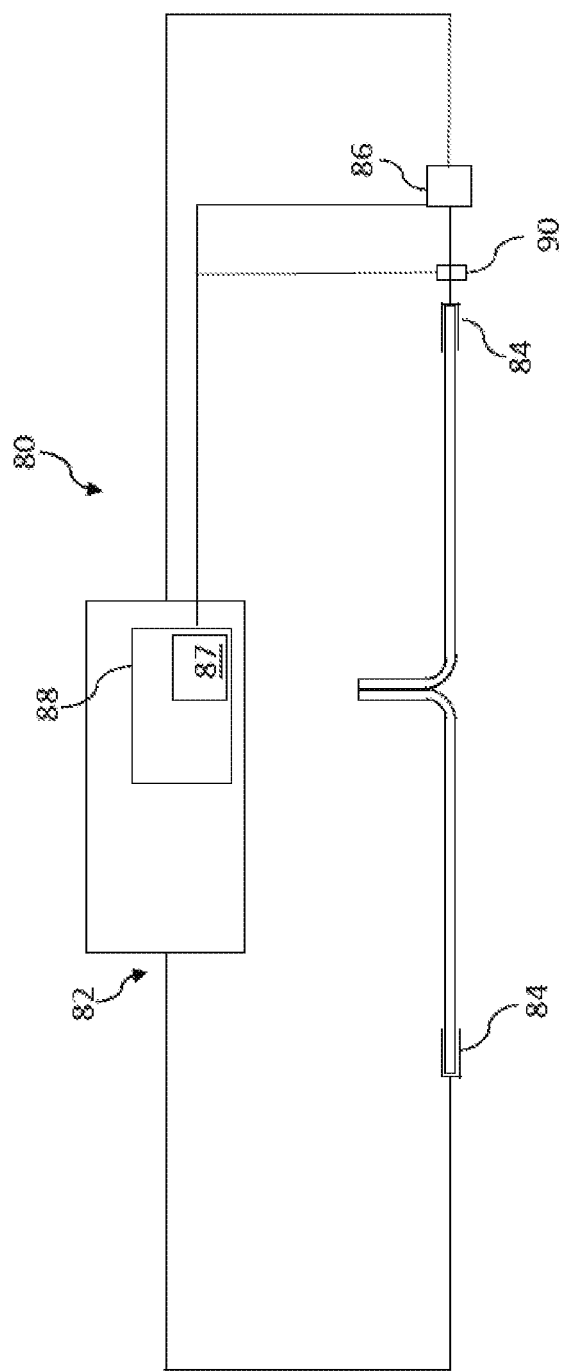
FIG. 7 is a schematic illustration of a test system for the test samples of FIGS. 1 and 2, in accordance with various embodiments.

A test system 80 for evaluating the test samples 20, 40 is illustrated in FIG. 7. The test system 80 includes a test machine 82 configured to apply a tensile load to the test sample 20 in this illustration. A pair of clamps 84 engage the coupons 22, 24 at opposite ends of the test sample 20. At least one actuator 86, such as a linear motor or cylinder, is provided to apply force to separate the coupons 22, 24. The test machine 82 includes a controller 88 to control its operation and may include a processor 87. The controller 88 may comprise any number of electronic control modules that receive various inputs which are analyzed enabling the controller 88 to operate the test machine 82.

The test machine 82 also includes a sensor set 90 to collect data on operation of the test machine 82 and on tests that are conducted. For example, the sensor set 90 may include a force sensor and a distance sensor. Generally, the controller 88 is configured to receive input from the sensor set 90 and to provide output such as in the form of force and displacement curves. For example, stress-strain curves showing the relationship between stress and strain may be generated by the controller 88 by gradually applying a tensile load to a test sample 20 and measuring the deformation. The stress and strain are then determined from the load and the deformation data that is supplied by the sensor set 90. The test sample 20 is configured to separate in a pure peel manner without bending or torsion to generate pure strain data and precise stress-strain curves.

Figure 8:
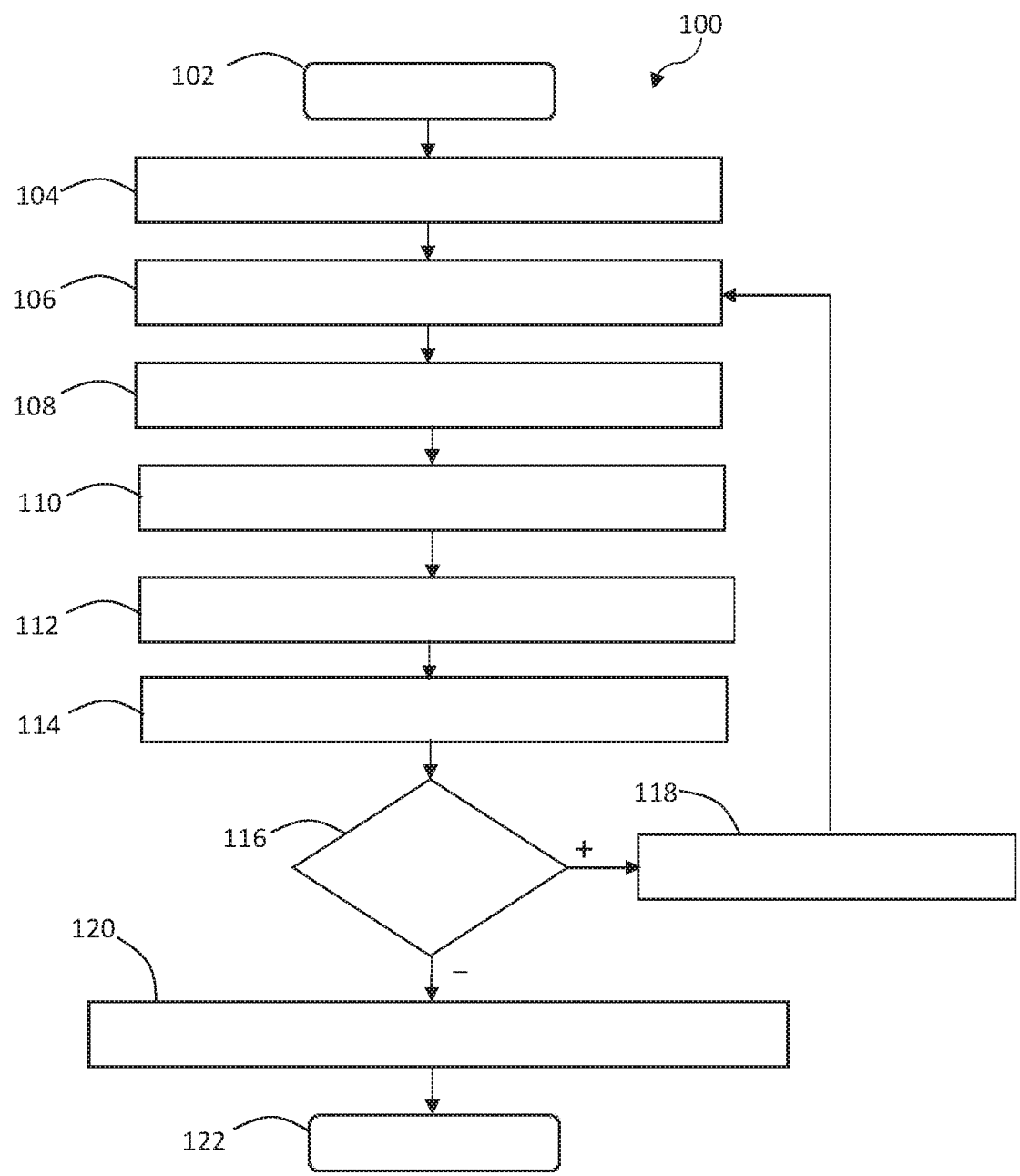
FIG. 8 is a flow chart of a process for joint performance validation, in accordance with various embodiments.

A process 100 for validating weld performance using data generated from testing the test samples 20, 40 in the test machine 82 is illustrated in FIG. 8. Certain steps of the process 100 may include methods or algorithms disclosed herein that may be embodied directly in hardware, in a software module executed by the processor 87, or in a combination of the two. A software module may reside in any form of storage medium known in the art. The storage medium (not shown) may be coupled with the processor 87, such the processor 87 reads information from, and writes information to, the storage medium. In the alternative, the storage medium may be integral to the processor 87.

The process 100 begins 102, such as when a manufactured product under development will use joints amenable to modeling with data inputs characterizing joint strength. For example, in the development of a vehicle, body and other structural components may be joined by welding. It may be desirable to conduct computer based modelling of the vehicle under development, such as to simulate crash events to model the vehicles response. The material composition of the vehicle's components and the process parameters for joining the components is determined 104. For example, body panel materials and thicknesses may be determined, and welding parameters may be determined for use in joining the body panels.

Coupons 22, 24 are fabricated 106. For example, the coupon 22 is fabricated 106 by creating a rectangular blank of the same material intended to be used for one of the body panels to be joined. The rectangular blank is bent to form the legs 21, 23 of the coupon 22 to be disposed perpendicular to each other at ninety degrees. The radius 72 is formed between the legs 21, 23. The coupon 24 is fabricated, such as by forming a rectangular blank similar in size to that formed for the coupon 22. The blank is composed of the material and has a thickness that coincides with that of the other body panel being joined. The opening 39 is formed such as by removing material from the blank and the resulting tab-shaped segment 34 is bent perpendicular at ninety degrees to the remainder of the coupon 24. The lengths of the longitudinal legs of the coupons 22, 24 are selected to accommodate the grip requirements of the test machine 82.

The process 100 proceeds with the coupons 22, 24 being joined, such as by the weld bead 26, to form 108 the test sample 20. The joint 25 is formed using the welding process parameters developed for joining the components of the final product simulated by the test sample 20. For example, the welding process parameters that will be used to join the vehicle body panels may be used. The test sample 20 is loaded in the test machine 82 and a test is performed 110, pulling the coupons 22, 24 apart, which may include separation. Data including force and displacement is collected, such as through input of the sensor set 90, and outputs such as stress-strain curves are generated by the controller 88 and recorded 112 as test results. The test results may be evaluated 114 such as for weld quality and to evaluate and optimize the weld design. In certain material combinations a parent material tear may occur. The evaluation 114 may include characterizing the separation as one of a weld failure, a coupon parent material failure, and a heat affected zone failure. When parent material failures are occurring, the geometry of the coupons 22, 24 may be adjusted to align the coupon parent material failure location to the centerline of the coupons to further reduce non-peel loads from influencing the data. For example, the trim edge forming the opening 39 of coupon 24 would be moved to the right as viewed in FIG. 1. relative to the coupon 22, when the coupon 24 is formed of a thinner material than the coupon 22 and tears occur on the left (as viewed) side of the weld bead 26 in the segment 34.

The process 100 continues and a determination 116 may be carried out as to whether weld parameter modification 118 is desired. For example, the weld may be tuned by varying weld penetration and evaluating the results. When weld modification is not needed, the process 100 proceeds to use 120 the test results, such as to model weld performance in the product manufactured using the weld. For example, commercially available vehicle crash simulation software may employ the test results in determining how welded components react to applied loads. With use 120 of the test results, the process 100 ends 122.

Through the foregoing embodiments, methods are provided for testing joints, such as to evaluate welds for weld design optimization, and to generate data for product validation, such as through computer simulation. Advantageously, accurate stress-strain curves result, which improves confidence in models used to simulate performance of a product that will be built using the coupon materials and weld parameters being tested. For example, in vehicle development, the modelling results may reduce the need to physically impact test vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for joint performance validation, the method comprising:
    fabricating a first coupon from a first blank including bending the first blank to have a first leg and a second leg disposed at substantially ninety degrees relative to the first leg;
    fabricating a second coupon from a second blank including forming an opening in a segment of the second blank, wherein the segment is disposed adjacent an end of the second blank, and bending the segment approximately ninety degrees;
    forming a test sample including joining the first coupon and the second coupon together at a joint with the first leg attached to the segment approximately at a center of the first leg; and
    subjecting the test sample to a force test.

2. The method of claim 1, wherein forming the opening comprises removing a corner at the end of the second blank so that the segment comprises a tab on the second coupon, and forming a radius adjacent the segment.

3. The method of claim 2, comprising forming the radius to be greater than ten millimeters in size.

4. The method of claim 1, wherein forming the opening comprises forming a slot in the segment.

5. The method of claim 1, comprising:
    recording force and displacement; and
    characterizing, using the recorded force and displacement, the test sample.

6. The method of claim 1, comprising forming the joint as a weld bead along an edge of the segment.

7. The method of claim 1, wherein the first leg has a first width and the segment has a second width that is approximately half of the first width.

8. The method of claim 1, comprising pulling the coupons apart by a test machine until separation of the coupons occurs.

9. The method of claim 8, comprising:
    characterizing the separation as one of a weld failure, a coupon parent material failure, and a heat affected zone failure; and
    adjusting, when the coupon parent material failures occur, geometry of the coupons to align a location of the coupon parent material failure to a centerline of the coupons.

10. The method of claim 8, comprising:
    recording force and deflection; and
    modeling the joint using the force and deflection.

11. A method for joint performance validation, the method comprising:
    fabricating a first coupon from a first blank by bending the first blank to have a first leg and a second leg disposed at substantially ninety degrees relative to the first leg;
    fabricating a second coupon from a second blank by removing a portion of a segment of the second blank, wherein the segment is disposed adjacent an end of the second blank, and bending the segment approximately ninety degrees;
    forming a test sample by joining the first coupon and the second coupon together at a joint that comprises a weld located approximately at a center of the first leg, with the first leg attached to the segment by the weld;
    subjecting the test sample to a force test;
    recording test data from the force test; and
    evaluating the weld using the test data.

12. The method of claim 11, wherein forming the opening comprises removing a corner at the end of the second blank so that the segment comprises a tab on the second coupon, and forming a radius extending from the tab.

13. The method of claim 11, wherein forming the opening comprises forming a slot in the segment, wherein the slot is closed.

14. The method of claim 11, comprising:
    recording force and displacement; and
    characterizing, using the recorded force and displacement, the weld.

15. The method of claim 11, wherein the weld is formed as an elongated bead along an edge of the segment.

16. The method of claim 11, wherein the first leg has a width and the segment extends to a point located at approximately half of the width.

17. The method of claim 11, comprising pulling the coupons apart by a test machine until separation of the coupons occurs.

18. The method of claim 17, comprising characterizing the separation as one of a weld failure, a coupon failure, and a heat affected zone failure.

19. The method of claim 18, comprising:
recording force and deflection; and
modeling the joint using the force and deflection.

20. A method for joint performance validation, the method comprising:
 determining material composition and weld parameters for a product;
 fabricating a first coupon and a second coupon using the material composition;
 fabricating the first coupon from a first blank by bending the first blank to have a first leg and a second leg disposed at substantially ninety degrees relative to the first leg;
 fabricating the second coupon from a second blank by removing a portion of a segment of the second blank, wherein the segment is disposed adjacent an end of the second blank, and bending the segment approximately ninety degrees;
 forming a test sample by joining the first coupon and the second coupon together at a joint that comprises a weld located approximately at a center of the first leg, with the first leg attached to the segment by the weld, wherein the weld is formed using the weld parameters;
 performing a force test on the test sample;
 recording force and deflection of the test sample; and
 modeling the joint using the recorded force and deflection.

* * * * *